US008715371B2

(12) United States Patent  
Behrendt et al.

(10) Patent No.: US 8,715,371 B2
(45) Date of Patent: May 6, 2014

(54) FUEL COMPOSITION

(75) Inventors: Christiane Behrendt, Hamburg (DE); Ingrid Maja Guenther, Ince Chester Cheshire (GB); Frank Juergen Haase, Hamburg (DE); Valeria Loreti, Hamburg (DE)

(73) Assignee: Shell Oil Company, Houston, TX (US)

( * ) Notice: Subject to any disclaimer, the term of this patent is extended or adjusted under 35 U.S.C. 154(b) by 835 days.

(21) Appl. No.: 12/599,428

(22) PCT Filed: May 8, 2008

(86) PCT No.: PCT/EP2008/055699
§ 371 (c)(1),
(2), (4) Date: Aug. 24, 2010

(87) PCT Pub. No.: WO2008/138861
PCT Pub. Date: Nov. 20, 2008

(65) Prior Publication Data
US 2010/0307428 A1 Dec. 9, 2010

(30) Foreign Application Priority Data
May 11, 2007 (EP) .................................. 07108034

(51) Int. Cl.
*C10L 1/10* (2006.01)
(52) U.S. Cl.
USPC ............................................. 44/300; 585/14
(58) Field of Classification Search
USPC ............................................. 44/300; 585/14
See application file for complete search history.

(56) References Cited

U.S. PATENT DOCUMENTS

| 2,688,840 A | 9/1954 | Schirmer et al. ............... 60/35.4 |
| 4,125,566 A | 11/1978 | Dinh et al. ..................... 260/676 |
| 4,478,955 A | 10/1984 | Pesa et al. ...................... 518/713 |
| 5,378,348 A | 1/1995 | Davis et al. ...................... 208/27 |
| 5,766,274 A | 6/1998 | Wittenbrink et al. ............ 44/436 |
| 5,888,376 A | 3/1999 | Wittenbrink et al. ........... 208/59 |
| 6,204,426 B1 | 3/2001 | Miller et al. .................. 585/739 |
| 7,311,815 B2 * | 12/2007 | Abazajian ..................... 208/143 |
| 2004/0149627 A1 * | 8/2004 | Koide et al. ..................... 208/15 |

FOREIGN PATENT DOCUMENTS

| DE | 2528236 | * 1/1977 | |
| EP | 147873 | 7/1985 | |
| EP | 583836 | 2/1994 | ............. C10G 65/12 |
| EP | 1101813 | 5/2001 | ............. C10G 47/14 |
| GB | 2077289 | 12/1981 | ............. C07C 1/04 |
| GB | 2399571 | 9/2004 | ............. C10L 1/04 |
| WO | WO9714768 | 4/1997 | ............. C10L 1/02 |
| WO | WO9714769 | 4/1997 | ............. C10L 1/02 |
| WO | WO0011116 | 3/2000 | ............. C10L 1/04 |
| WO | WO0011117 | 3/2000 | ............. C10L 1/08 |
| WO | WO0020534 | 4/2000 | ............. C10L 1/08 |
| WO | WO0020535 | 4/2000 | ............. C10L 1/08 |
| WO | WO0183406 | 11/2001 | ............. C07C 1/00 |

(Continued)

*Primary Examiner* — Cephia D Toomer

(57) ABSTRACT

A domestic heating fuel composition, comprising (a) a paraffinic hydrocarbon composition comprising at least 90 wt % normal paraffins and/or iso-paraffins comprising from 6 to 24 carbon atoms, wherein the weight ratio of iso-paraffins to normal-paraffins is below 6 to 1, and (b) at least one compound having a C/H molar ratio of above 0.8 and soluble in component (a) at ambient conditions, wherein the component (b) is present in the fuel composition in an amount effective to increase the responsiveness of a yellow/red flame detector to a required threshold level.

16 Claims, 3 Drawing Sheets

(56) References Cited

FOREIGN PATENT DOCUMENTS

| WO | WO0183641 | 11/2001 | | |
| WO | WO0183647 | 11/2001 | | |
| WO | WO0183648 | 11/2001 | | |
| WO | WO2004009741 | 1/2004 | ............... | C10L 1/04 |
| WO | WO2004009743 | 1/2004 | ............... | C10L 1/04 |
| WO | WO2004009744 | 1/2004 | ............... | C10L 1/04 |
| WO | WO2004022674 | 3/2004 | ............... | C10L 1/08 |
| WO | WO2006069408 | 6/2006 | ............... | C10L 1/04 |
| WO | WO2006075057 | 7/2006 | | |

* cited by examiner

FUEL COMPOSITION

The present application claims priority of European Patent Application No. 07108034.5 filed 11 May 2007.

FIELD OF THE INVENTION

The present invention is directed to fuel composition for use in a domestic heating, lighting and cooking. In particular it is directed at a fuel composition that may be employed in a pressure jet burner for domestic heating (e.g. yellow flame burner).

BACKGROUND OF THE INVENTION

The use of highly paraffinic kerosene and gas oil hydrocarbon fuel fractions in fuel compositions for domestic heating, lighting and cooking permits exceptionally low NOx and soot emissions.

Highly paraffinic hydrocarbon products that are boiling in the kerosene and gasoil range may conveniently be derived from the products of a Fischer-Tropsch process, such as the low temperature Fischer-Tropsch process disclosed in EP-A-1523538 and EP-A-1523539, or from mineral oil derived sources, e.g. slack waxes. Other processes delivering such products include a process for the reductive decarboxylation/decarbonylation reaction of fatty acids and/or fatty acid esters as for instance disclosed in WO-A-2004022674 and WO-A-2006075057.

Domestic heating appliances such as evaporator burners and pressure jet burners are provided with a flame detector. These detectors act as a safety measure by monitoring the constant presence of a flame. Many of the flame detectors in service today are based on optical measurements (e.g. photo cells) and detect a signal at a particular wavelength of light, in particular the light emitted by the flame of mineral oil-derived fuels in the visible yellow and/or red light spectrum. Applicants found that highly paraffinic synthetic fuels such as Fischer-Tropsch derived fuels or natural fatty acid derived fuels as those disclosed in EP-A-1546288 result in a change of flame colour towards the visible blue spectrum, or even fall outside the visible spectrum, resulting in transparent flames. This blue or transparent colour cannot be registered correctly by the above-described detectors since the detector is unable to recognise the flame correctly, thereby leading to false shutdowns.

Applicants have now found that a domestic heating fuel composition comprising paraffinic synthetic fuels such as Fischer-Tropsch derived fuels or natural fatty acid derived fuels as disclosed in EP-A-1546288 can be formulated that permits to obtain the desired benefit in reduction in emissions, while also generating a yellow flame and enabling conventional flame sensors to detect a flame signal.

This object is achieved by the following composition:

SUMMARY OF THE INVENTION

A domestic heating fuel composition, comprising
(a) a paraffinic hydrocarbon composition comprising at least 90 wt % normal paraffins and/or iso-paraffins having from 6 to 24 carbon atoms, and
(b) at least one compound having a C/H molar ratio of above 0.8, wherein compound (b) is soluble in component (a) at ambient conditions, and present in the fuel composition in an amount effective to increase the responsiveness of a yellow/red flame detector to a required threshold level.

DETAILED DESCRIPTION OF THE INVENTION

Figure 1:
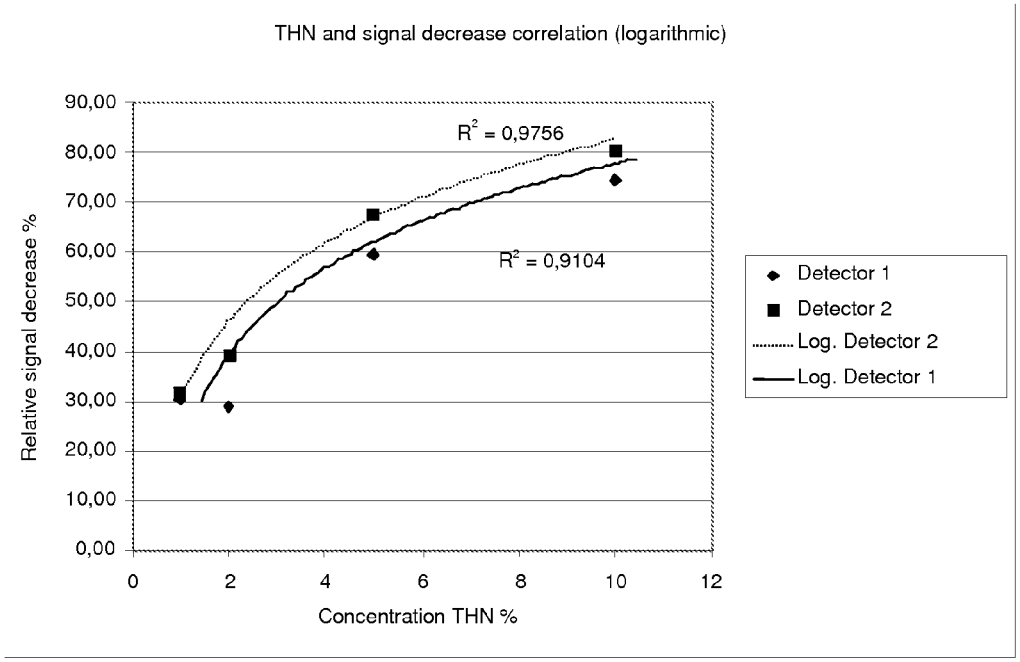
FIG. 1 discloses the relative signal decrease [%] measured on a yellow/red flame detector for compositions comprising different concentrations of tetrahydronaphthtalene in a heating fuel composition comprising a Fischer-Tropsch derived kerosene, as calculated on the basis of the relative base fuel signal, applying a linear correlation. The base fuel was a Fischer-Tropsch-derived kerosene employed as component (a), having the following characteristics: density (at 15° C. in kg/m$^3$) of 734.8, sulphur content (wt %) of below 0.0005, kinematic viscosity at 20° C. (mm$^2$/s, cSt) of 1.246, and a flash point of 43° C.

The present invention relates to a hydrocarbon fuel composition, particularly for domestic use as heating, lighting and or cooking fuel. It has in principle no unpleasant odour when being handled, and exhibits an excellent combustion behaviour leading to low emissions of nitrous and sulphurous oxides and soot in flue gases.

The fuel composition preferably has a flash point (as determined by ASTM D93) of at least 40° C., preferably at least 60° C., and more preferably between 60° C. and 80° C.

The fuel composition preferably has a sulphur content of below 500 mg/kg (500 ppmw), more preferably below 100 ppmw, yet more preferably below 15 ppmw, again more preferably below 10 ppmw, yet more preferably below 5 ppmw as determined by ASTM D 3120-03A.

The fuel composition preferably comprises less than 50 ppmw nitrogen, more preferably less than 35 ppm, yet more preferably less than 15 ppmw, and most preferably less than 1 ppmw of Nitrogen, as determined by ASTM D 4629.

The fuel composition preferably has a smoke point of at least 30 mm, preferably above 35 mm, more preferably above 40 mm, and most preferably above 45 mm, as determined by IP 57; and a density at 15° C. of in the range of from 0.65 to 0.90 g/cm$^3$, more preferably in the range of between 0.67 and 0.79 g/cm$^3$, yet more preferably in the range of from 0.680 to 0.845 g/cm$^3$, as determined by ASTM D1298.

The fuel composition preferably comprises at least 75 wt % of component (a). More preferably, the domestic heating fuel composition comprises at least 80 wt %, more preferably at least 85 wt %, more preferably at least 90 wt %; and most preferably at least 95 wt % of component (a).

The fuel composition preferably has a boiling point range within the usual kerosene and gas oil range of 130 to 370° C. More preferably, its components boil for more than 90 wt % in the range of from 170° C. to 280° C., as determined by ASTM D2887. The domestic heating fuel composition preferably has a pour point below −40° C., more preferably below −50° C. It further preferably has a kinematic viscosity at 40° C. (ASTM D445) in the range from 1.2 to 4.0 mm$^2$/s (cSt), more preferably in the range from 1.3 to 3.5 mm$^2$/s (cSt), and yet more preferably in the range from 1.35 to 3.0 mm$^2$/s (cSt).

The domestic heating fuel composition preferably may further comprise an odour marker and/or a colour marker, or other suitable materials, such as insect-repellents, and stabilizers that impede growth of microbes and/or Algae. The fuel composition may be used for instance in evaporating burner/ovens, also referred to as wick ovens, which are for instance supplied by Jotul ASA Norway, AGA Foodservices Group, Sunpot, and Corona plc. These ovens are technically simple and often require no additional moving parts to operate.

Other suitable oil burner assemblies include burners which first atomise the fuel into small droplets, e.g. so-called "pressure-jet" (also known as "gun-type") burners, and wherein the combustion takes place on the surface of the resulting small liquid droplets or takes place on the evaporated mixture of fuel and gas.

EP-A-1523538 proposes the use of Fischer-Tropsch derived fuel for domestic heating appliances. Equally, WO-A-2006/069408 discloses that a highly isoparaffinic kerosene product fraction as obtained in a high temperature Fischer-Tropsch process followed by a hydrotreating process and distillation could be employed for domestic heating appliances, including wick burners.

As set out above, false shutdowns have been reported with a Fischer-Tropsch derived fuel in pressure-jet and wick-burner heating equipment, since due to the blue or transparent colour that is usually associated with a Fischer-Tropsch derived fuel (kerosene) flame, the yellow flame detectors installed in this equipment were unable to recognise the flame colour correctly, and shut down the combustion process.

Applicants further found use of additives such as Metal-based combustion improvers, for instance ferrocene, methyl-cyclopentadienylmanganese-tricarbonyl (MMT), in a Fischer-Tropsch derived SMDS fuel as disclosed in EP-A-1523538 did not affect a flame colour at the desired location, i.e. the part of the flame where the signal is being detected. Furthermore, the low solubility of such additives caused problems in fuel stability. GB-A-2399571 discloses a process for making alkyl aromatics such as cumene, and alkyl cyclo-paraffins from Fischer Tropsch products, as well as blends of such compounds, as components for salable distillate fuels having improved seal swell and lubricity properties. No mention is made of the use of such blends in domestic heating fuels.

Applicants have now found that a yellow flame at the flame root can be achieved when using a fuel composition according to the invention, while at the same time maintaining the emission benefits, e.g. soot and the NOx emission below the level of conventional Industrial Gas Oil or Kerosene fuel.

More specifically, applicants found that the C/H molar ratio in the compound or compounds employed as component (b) permits to determine the effect of these compounds on the flame signal. It was found that at a higher C/H molar ratio, the yellow radiation of the flame was increased significantly. At a C/H molar ratio of above 0.8, the component (b) was capable of achieving a significant effect in the flame detectors employed.

A further advantage is that the carbon monoxide and hydrocarbon emissions at the cold or hot start of the yellow flame burner are reduced as compared to when mineral oil derived fuels are used. This is also very advantageous when the burner is used in for example a domestic heating application wherein frequently the burner has to start and stop. In cooking applications, a blue flame is difficult to spot and may increase dangers of burns. In lighting applications, blue or colourless flames are not considered a suitable light source. Applicants found that these issues could be resolved by the fuel composition according to the invention.

The operating conditions of the yellow flame burner may be the same as the operating conditions used for the state of the art fuels. The proportion of air in excess of that required for stoichiometric combustion is known as the excess air ratio or "lambda", which is defined as the ratio of total air available for combustion to that required to burn all of the fuel. Preferably the lambda is between 1 and 2 and more preferably between 1 and 1.6.

Applicants found that by using the fuel composition according to the invention, a very low lambda of between 1.05 and 1.2 could be applied without large emissions of carbon monoxide as would be the case when mineral-oil-based heating oil, Industrial Gas Oil and or Domestic heating oil would be used.

The heating fuel composition according to the invention comprises (a) a paraffinic hydrocarbon composition comprising at least 99 wt % normal paraffins and/or iso-paraffins having from 6 to 24 carbon atoms.

Component (a) preferably has a boiling point range within the usual kerosene range of 130 to 300° C. (as determined by ASTM D2887), depending on grade and use. It will further typically have a density from 775 to 840 kg/m$^3$, preferably from 780 to 830 kg/m$^3$ at 15° C. (e.g. ASTM D4502 or IP 365).

It further typically will have an initial boiling point in the range 130 to 160° C. and a final boiling point in the range 220 to 370° C. (as determined by ASTM D2887). Its kinematic viscosity at −20° C. (ASTM D445) suitably will be in the range from 1.2 to 8.0 mm$^2$/s, preferably in the range of from 1.3 to 4 mm$^2$/s (cSt). Component (a) preferably boils for more than 90 wt % between 140° C. and 400° C., more preferably between 160 and 370° C., and most preferably between 160 and 220° C. (ASTM D2887). Preferably, it will have an initial boiling point of 140° C. and a final boiling point of 370° C. Yet more preferably it will have an initial boiling point of 140° C. and a final boiling point of 220° C.

The n-paraffinic and/or iso-paraffinic hydrocarbon compounds of component (a) comprise from 6 to 24 carbon atoms, preferably from 7 to 23 carbon atoms, yet more preferably from 8 to 22 carbon atoms.

The weight ratio of normal-paraffins to iso-paraffins in component (a) is preferably lower than 4:1, more preferably lower than 3:1, yet more preferably lower than 2:1, and most preferably lower than 1:1.

Component (a) of the fuel composition of the present invention may be obtained by any suitable method, and from any suitable source.

The n-paraffins and iso-paraffins in component (a) are preferably derived from an optionally isomerised product of (i) a Fischer-Tropsch synthesis, and/or are derived from (ii) the product of a process comprising a reductive decarboxylation/decarbonylation reaction of fatty acids and/or fatty acid esters. The products of (i) and (ii) may further be optionally hydrocracked and/or isomerised and distilled in order to arrive at a fuel fraction having the desired properties. Alternatively, component (a) may be obtained by cracking or synthesis, for example, from the various fractions obtained in petroleum refining. Preferred crude petroleum derived paraffinic fuel fractions are the low sulphur (e.g. less than 50 ppm sulphur) kerosene or diesel fractions.

The fuel composition according to the invention may comprise a fuels fraction which may be any fraction of the middle distillate fuel range, which can be isolated from the (hydrocracked) Fischer-Tropsch synthesis product and/or decarboxylation/decarbonylation reaction product. Typical domestic fuel fractions will boil in the naphtha, kerosene or gas oil range.

Suitably, in accordance with the present invention, the fuel component (a) will consist of at least 90% wt, preferably at least 95% wt, more preferably at least 98% wt, again more preferably at least 99% wt, and mot preferably at least 99.5% wt of paraffinic hydrocarbon components such as n-paraffins, iso-paraffins and cyclo-paraffins. Preferably, component (a) comprises at least 50% wt of normal and iso-paraffins, more preferably at least 65% wt, yet more preferably at least 75% wt, again more preferably at least 85% wt, and most preferably at least 95% wt of normal and iso-paraffins.

The weight ratio of iso-paraffins to normal paraffins will preferably be below 6:1, more preferably, the weight ratio of iso-paraffins to normal paraffins is below 5:1, more preferably below 4:1, yet more preferably below 3.8:1. A practical lower limit for the weight ratio of iso-paraffins to normal paraffins of component (a) is preferably on or above 1:1.

If a fraction of paraffins is employed as component (a) that is boiling in the range of from 140° C. to 220° C., the weight ratio of iso-paraffins to normal paraffins is preferably below 1.8, while at higher boiling components, e.g. boiling in the range of from 220° C. to 370° C., the weight ratio of iso-paraffins to normal paraffins is preferably below 3.8.

The actual value for this ratio will be determined, in part, by the Fischer-Tropsch synthesis or decarboxylation/decarbonylation reaction product, and/or partly by the optional hydroconversion process used to prepare the component (a) from the Fischer-Tropsch synthesis or decarboxylation/decarbonylation reaction product.

Examples of Fischer-Tropsch derived kerosene and gas oils suitable as component (a) are described in EP-A-583836, WO-A-9714768, WO-A-9714769, WO-A-0011116, WO-A-0011117, WO-A-0183406, WO-A-0183648, WO-A-0183647, WO-A-0183641, WO-A-0020535, WO-A-0020534, EP-A-1101813, U.S. Pat. No. 5,766,274, U.S. Pat. No. 5,378,348, U.S. Pat. No. 5,888,376 and U.S. Pat. No. 6,204,426. Accordingly, component (a) preferably comprises a Fischer-Tropsch product which contains more than 80 wt % of normal- and iso-paraffins, less than 1 wt % aromatics, less than 5 ppm sulphur and less than 1 ppm nitrogen and wherein the density of the Fischer-Tropsch derived product is between 0.65 and 0.8 g/cm³ at 15° C.

By "Fischer-Tropsch derived" is meant that the fuel is, or derives from, a synthesis product of a Fischer-Tropsch condensation process. The Fischer-Tropsch reaction converts carbon monoxide and hydrogen into longer chain, usually paraffinic, hydrocarbons:

$n(CO+2H_2)=(-CH_2-)_n+nH_2O+\text{heat}$, in the presence of an appropriate catalyst and typically at elevated temperatures (e.g. 125 to 300° C., preferably 175 to 250° C.) and/or pressures (e.g. 500 to 10000 kPa, preferably 1200 to 5000 kPa). Hydrogen:carbon monoxide ratios other than 2:1 may be employed if desired.

The carbon monoxide and hydrogen may themselves be derived from organic or inorganic, natural or synthetic sources, typically either from natural gas or from organically derived methane.

A kerosene or gas oil product may be obtained directly from this reaction, or indirectly for instance by fractionation of a Fischer-Tropsch synthesis product or from a hydrotreated Fischer-Tropsch synthesis product, or from the decarboxylation/decarbonylation product. Hydrotreatment can involve hydrocracking to adjust the boiling range (see, e.g. GB-B-2077289 and EP-A-0147873) and/or hydroisomerisation which can improve base fuel cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired kerosene fraction(s) may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for example in U.S. Pat. No. 4,125,566 and U.S. Pat. No. 4,478,955.

Typical catalysts for the Fischer-Tropsch synthesis of paraffinic hydrocarbons comprise, as the catalytically active component, a metal from Group VIII of the periodic table, in particular ruthenium, iron, cobalt or nickel. Suitable such catalysts are described for example in EP-A-0583836 (pages 3 and 4).

An example of a Fischer-Tropsch based process is the SMDS (Shell Middle Distillate Synthesis) described in "The Shell Middle Distillate Synthesis Process", van der Burgt et al (paper delivered at the 5th Synfuels Worldwide Symposium, Washington D.C., November 1985; see also the November 1989 publication of the same title from Shell International Petroleum Company Ltd., London, UK). This process (also sometimes referred to as the Shell™ "Gas-to-Liquids" or "GTL" technology) produces middle distillate range products by conversion of a natural gas (primarily methane) derived synthesis gas into a heavy long-chain hydrocarbon (paraffin) wax which can then be hydroconverted and fractionated to produce liquid transport fuels such as kerosene fuel compositions.

A version of the SMDS process, utilising a fixed-bed reactor for the catalytic conversion step, is currently in use in Bintulu, Malaysia and its products have been blended with petroleum derived gas oils in commercially available automotive fuels. Gas oil and kerosene prepared by the SMDS process are commercially available from Shell companies.

By virtue of the Fischer-Tropsch process, a Fischer-Tropsch derived fuel has essentially no, or undetectable levels of, sulphur and nitrogen. Compounds containing these heteroatoms tend to act as poisons for Fischer-Tropsch catalysts and are therefore removed from the synthesis gas feed. Further, the process as usually operated produces no or virtually no aromatic components.

A Fischer-Tropsch derived fuel used in the present invention will typically have a density from 730 to 770 kg/m³ at 15° C.; a kinematic viscosity from 1.2 to 6, preferably from 2 to 5, more preferably from 2 to 3.5, mm²/s at −20° C.; and a sulphur content of 20 ppmw (parts per million by weight) or less, preferably of 5 ppmw or less, more preferably less than 1 ppmw.

Preferably the Fischer-Tropsch derived fuel is a product prepared by a Fischer-Tropsch methane condensation reaction using a hydrogen/carbon monoxide ratio of less than 2.5, preferably less than 1.75, more preferably from 0.4 to 1.5, and ideally using a cobalt containing catalyst in the so-called low temperature Fischer-Tropsch process, in contrast to the high temperature Fischer-Tropsch process, products of which are for example as disclosed in WO-A-2006/069408.

The aromatics content of component (a) will typically be below 5% wt, preferably below 2% wt and more preferably below 1% wt, as determined by ASTM D4629.

Component (a) may also preferably be in part or in toto derived from the product of a reductive decarboxylation and/or decarbonylation reaction. By "derived from the product of a reductive decarboxylation/decarbonylation reaction" is meant that the fuel is, or derives from, the product of a process, wherein fatty acids and/or fatty acid esters area subjected to a reductive decarboxylation/decarbonylation reaction in the presence of hydrogen and a suitable decarboxylation and/or decarbonylation catalyst. Such processes are preferably carried out by bringing a feedstock comprising $C_8$-$C_{24}$ fatty acids, derivatives of $C_8$-$C_{24}$ fatty acids, or combinations thereof into contact into contact with a heterogeneous catalyst comprising one or more Group VIII metals selected from platinum, palladium, nickel, iridium, ruthenium and rhodium on a support selected from oxides and/or carbonaceous catalyst supports in the presence of hydrogen under decarboxylation/decarbonylation conditions, such as a temperature in the range of from 200° C. to 400° C. and under a pressure of from 0.1 MPa to 15 MPa, as for instance described in WO-A-20040022674 and WO-A-2006-075057.

The component (a) is further essentially free from olefinic components, i.e. it preferably has a content of olefins of below 10 mg/kg as determined by IP 129. It further preferably contains essentially no peroxides, i.e. it preferably has a peroxide number of less than 10 mg/kg, as determined by ASTM D3703.

Component (b) of the domestic heating fuel composition comprises at least one compound having a C/H molar ratio of above 0.6, wherein compound (b) is soluble in component (a) at ambient conditions, and present in the fuel composition in an amount effective to increase the responsiveness of a yellow/red flame detector to a required threshold level.

Preferably, component (b) is present in an amount of from 0.01% to 15 wt %, based on the total fuel composition.

Applicants found that the C/H molar ratio in the compound or compounds employed as component (b) permits to determine the effect of these compounds on the flame signal. It was found that at a higher C/H molar ratio, the yellow radiation of the flame was increased significantly. At a C/H molar ratio of above 0.8, the component (b) was capable of achieving a significant effect in the flame detectors employed.

It has also been found that the structure or the presence of heteroatoms in component (b) did have a much less significant influence on this behaviour.

Component (b) comprises at least one compound that is soluble in component (a) at ambient conditions, and in an amount effective to increase the responsiveness of a yellow/red flame detector to a required threshold level.

It was found that not all compounds with a C/H molar ratio of above 0.8 were sufficiently soluble in the highly paraffinic component (a). In particular, it was found that aromatic compounds without any alkyl substituents did not dissolve sufficiently to achieve the required flame detector response. However, preferably the compounds of component (b) comprise less than 3 heteroatoms, preferably less than 2 heteroatoms such as for instance nitrogen, oxygen and/or sulphur. A compound was determined as to be effective in changing the flame colour when the signal decrease in a Danfoss LSD (057H7093 9910) flame detector (detector 2) was above 40%, when employed under the below conditions.

Preferably, the C/H molar ratio is above 0.81, more preferably above 0.85 and yet more preferably above 0.83, and again more preferably above 0.87. Preferably, the C/H molar ratio is below 1.5, more preferably below 1.4, yet more preferably below 1.3, and most preferably below 1.25 in view of the low solubility of such highly unsaturated compounds in the fuel blend.

It is within the normal practice of a skilled person to determine solubility and detector response of a particular compound or mixture thereof in a fuel composition according to the present invention.

Compound (b) is preferably selected from the group comprising alkyl aromatic compounds, and/or conjugated or non-conjugated ethylenically and/or acetylenically unsaturated compounds, and/or mixtures thereof. More preferably, compound (b) is an alkyl-substituted monoaromatic compound, a conjugated cyclic or non-cyclic diene, or an acetylenically unsaturated alcohol, present in an amount of from 0.01 to 10 wt %, based on the total composition. Yet more preferably, component (b) is selected from cyclic alkenes such as cyclopentene or cyclohexene, non-conjugated or conjugated linear or cyclic alkadienes, such as cyclohexadiene and cyclopentadiene, dimers of such alkadienes such as dicyclopentadiene, allylic or acetylenically unsaturated compounds, and non-linear alkyl or cycloalkyl substituted aromatic compounds such as toluene and tetrahydronaphthalene. Particularly preferred are annulated alkylaromatic compounds such as tetrahydronaphthalene due to the high effectiveness found.

The subject invention also relates to the use of the domestic heating fuel composition according to the invention for the generation of heat by evaporation and subsequent combustion in the presence of oxygen to form hot flue gases.

The pressure jet or wick burners using the domestic heating fuel composition according to the invention are preferably applied for domestic heating, wherein the heat of combustion is used to heat water by indirect heat exchange in so-called boilers. A pressure jet burner or wick burner using the domestic heating fuel composition according to the invention may advantageously be further used for direct heating of large spaces. Herein, the flue gases as obtained by said use are preferably used to directly heat a space. Such applications are characterized in that the flue gases are directly supplied to said space to heat up said space. Spaces such as tents and halls are often heated up with such an apparatus. Further use of the domestic heating fuel composition according to the invention are for cooking, and/or for lighting purposes.

The fuel composition may also comprise one or more of the following performance additives: detergents, for example; stabilizers; metal-deactivators; (ashless) dispersants; anti-oxidants; cold flow improvers; anti-corrosion additives; re-odorants; biocides; lubricity enhancers; dehazers; antistatic agents; foam reducers, insect-repellents; markers and dyes as required by safety or for tax regulations.

Component (a) of the fuel compositions is colourless and odourless. For safety reasons an odour marker, as for example applied in natural gas for domestic consumption, may be present in the fuel composition. Also a colour marker may be present to distinguish the fuel composition from others.

The total content of the additives may be suitably between 0 and 1 wt % and preferably below 0.5 wt %.

The invention will now be illustrated with the following non-limiting examples.

EXAMPLES

The following equipment was applied in the examples: A yellow flame burner of Type 800 ULV-S (Shell Direct GmbH; nozzle: Steinen 0.50 gal/h/60° spray angle, with pre-heater) in a TÜV combustion chamber (a standardized test heating chamber used generally for accreditation purposes), a PKR-140 boiler (Oertli Rohleder Waermetechnik GmbH)). The fuel was supplied via piping connected to multiple valves leading to the different fuel containers to enable switching from one fuel to another during operation.

Two different photo resistors were employed as yellow flame detectors. The first was original equipment as commercially available from Hamamatsu/Photonix, Japan, and is referred to herein as "Detector 1", the second was a Danfoss LSD (057H7093 9910) detector and is referred to as "Detector 2". Both delivered resistance (in ohm) as an output signal.

A lower output signal (in k$\Omega$) indicates a stronger flame signal. The two detectors delivered signals differing in the measured intensity: Detector 2 was more sensitive (i.e. detected a greater difference in the flame intensity when the fuel composition is changed) and, consequently, showed bigger fluctuations. On the average of the significant high number of the base fuel measurements, the standard deviation of both detectors was calculated, being 3 k$\Omega$ for Detector 1 and 15 k$\Omega$ for Detector 2 (respectively, 4.5 and 6.6% relative standard deviation).

In each individual test run, the pump pressure was kept constant at 80 kPa (8 bar) for the different fuels to obtain comparable results. The $CO_2$ content in the flue gas was adjusted accordingly (in these tests to approx. 13.0% v/v), to maintain a constant air/fuel ratio for each fuel and pressure. For all tests, the flame signal, $NO_x$ and CO emissions were measured.

Example 1

A Fischer-Tropsch-derived kerosene was employed as component (a), having the following characteristics: density (at 15° C. in kg/m$^3$) of 734.8, sulphur content (wt %) of below 0.0005, kinematic viscosity at 20° C. (mm$^2$/s, cSt) of 1.246, and a flash point of 43° C.

In Table 1, components (b) as employed in the examples and comparative examples are listed (at a concentration 10 wt %, based on total composition), while table 2 shows the effect of the various fuel blends comprising X wt % of component (b) on the flame detection in Detectors 1 and 2 (see below). Dicyclopentadiene, toluene and tetrahydronaphthalene were found to be the most effective compounds (b) at a concentration of 10 wt %. During the experiment no increase in the $NO_x$ content was found for the above products.

The $NO_x$ and $CO_2$ emissions measured were lower for all Fischer-Tropsch derived fuel blends as compared to reference samples of normal gas oil or low sulphur gas oil.

As shown above, the ability of reducing the signal intensity, and therefore enhancing the yellow colour in the flame, is evident for several of the investigated compounds.

Slightly increased $NO_x$ emissions were measured for fuels blended with cyclohexene and laurylamine.

TABLE 1

Influence of the C/H ratio of additive compounds on the flame signal as measured by Detector 2

| Example No. | Component | Signal decrease Detector 2, [%] | Molar composition C | H | X | C/H molar ratio |
|---|---|---|---|---|---|---|
| Example 1 | Dicyclopentadiene | 64.71 | 10 | 12 | — | 0.833 |
| Example 2 | Toluene | 68.09 | 7 | 8 | — | 0.875 |
| Example 3 | Tetrahydronaphthalene | 77.37 | 10 | 12 | — | 0.833 |

TABLE 1-continued

Influence of the C/H ratio of additive compounds on the flame signal as measured by Detector 2

| Example No. | Component | Signal decrease Detector 2, [%] | Molar composition C | H | X | C/H molar ratio |
|---|---|---|---|---|---|---|
| Comparative Example 1 | Cyclohexene | 32.10 | 6 | 10 | — | 0.600 |
| Comparative Example 2 | 2-Methyl-3-butyn-2-ol | 38.01 | 5 | 8 | O | 0.625 |
| Comparative Example 3 | Laurylamine | −5.72 | 12 | 27 | N | 0.444 |
| Comparative Example 4 | 1-Octanol | −4.75 | 8 | 18 | O | 0.444 |
| Comparative Example 5 | 1-Octanoic acid | −5.19 | 8 | 16 | O(2) | 0.500 |
| Comparative Example 6 | Cyclohexane | 7.71 | 6 | 12 | — | 0.500 |

TABLE 2

[%] Signal decrease, calculated on the basis of the relative base fuel signal.

| | | Relative signal decrease [%] | |
|---|---|---|---|
| Example No. | Compound | Detector 1 | Detector 2 |
| blank test | Base Fuel (no additives) | 9.9 | 9.5 |
| Example 1 | Dicyclopentadiene | 54.8 | 64.7 |
| Example 2 | Toluene | 60.9 | 68.1 |
| Example 3 | Tetrahydronaphthalene | 68.2 | 77.4 |
| Comparative Example 1 | Cyclohexene | 24.3 | 32.1 |
| Comparative Example 2 | 2-Methyl-3-butyn-2-ol | 32.2 | 38.0 |
| Comparative Example 3 | Laurylamine | −8.3 | −5.7 |
| Comparative Example 4 | 1-octanol | −9.1 | −4.8 |
| Comparative Example 5 | Octanoic acid | −9.0 | −5.2 |
| Comparative Example 6 | Cyclohexane | 9.0 | 7.7 |

Comparative Examples 7-10

Soap, anthracene and naphthalene (comparative examples 7, 9 and 9, respectively) were not soluble in the base fuel, and could not be analysed.

Examples 4-6 and Comparative Example 7

The concentration dependent efficacy of the tested fuel compositions was analysed. Table 4 lists the absolute signals for compositions comprising 1 wt % of the respective component (b):

TABLE 4

Difference in absolute signals of the compounds mostly affecting the flame colour for Detectors 1 and 2.

| Example | Compound | Difference absolute[kΩ]/ relative [%] Detector 1 | Difference absolute[kΩ]/ relative [%] Detector 2 |
|---|---|---|---|
| 4 | Tetrahydro-naphthalene | 19.2/30 | 70.5/31 |
| 5 | Toluene | 8.5/14 | 53.0/23 |
| 6 | Dicyclopentadiene | 6.4/11 | 40.5/18 |
| Comparative Example 7 | 2-Methyl-3-butyn-2-ol | 3.1/5 | 9.7/5 |

Examples 7-9 and Comparative Example 8

Combination of Compounds

To investigate if there may be a synergy of the best performing compounds, the following blends have been also investigated for their effect on the signal intensity. This evaluation shows that there is a non-linear synergistic response of a 1:1 mixture of two of toluene, tetrahydronaphthalene, dicyclopentadiene and comparative example 2-methyl-3-butyn-2-ol, each at 0.5% concentration):

TABLE 4

Base fuel kerosene blends containing a mixture of compounds at 1 wt % and their effect on the signal intensity

| Example | Component (b) | Relative signal decrease [%] Detector 1 | Relative signal decrease [%] Detector 2 |
|---|---|---|---|
| 7 | Toluene 0.5% + tetrahydronaphthalene 0.5% | 14.50 | 20.65 |
| 8 | Dicyclopentadiene 0.5% + 2-Methyl-3-butyn-2-ol 0.5% | 14.06 | 18.81 |
| 9 | Toluene 0.5% + Dicyclopentadiene 0.5% | 7.58 | 18.30 |
| Comp. 8 | Toluene 0.5% + 2-Methyl-3-butyn-2-ol 0.5% | 0.78 | 7.37 |

Examples 10-12 and Comparative Example 9

Figure 2:
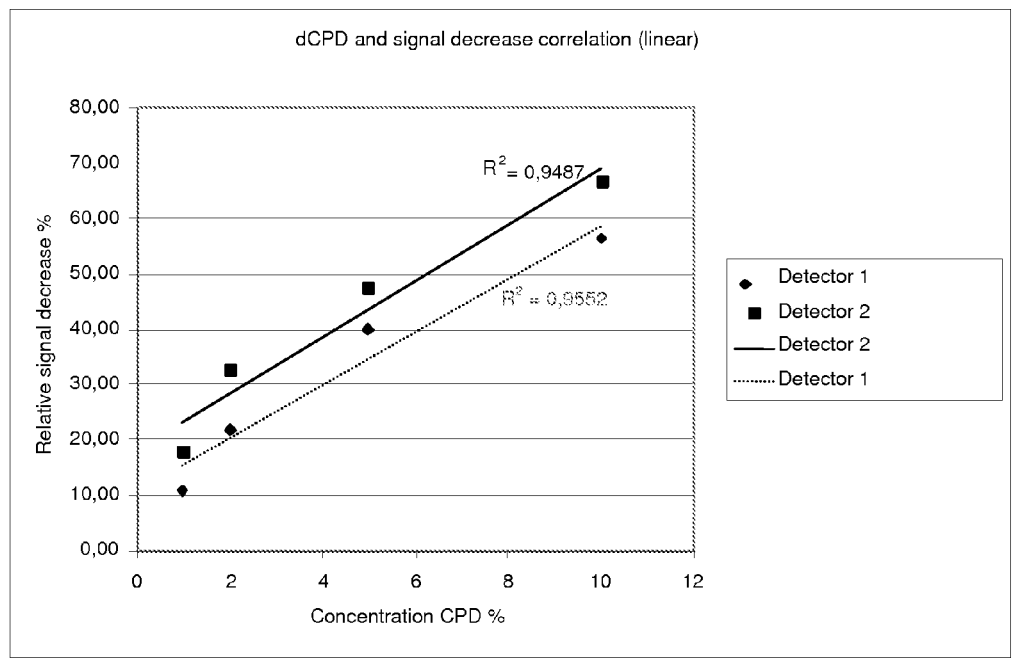
FIG. 2 discloses the relative signal decrease measured on a yellow/red flame detector for compositions comprising different concentrations of dicyclopentadiene in a heating fuel composition comprising a Fischer-Tropsch derived kerosene as in FIG. 1.
Figure 3:
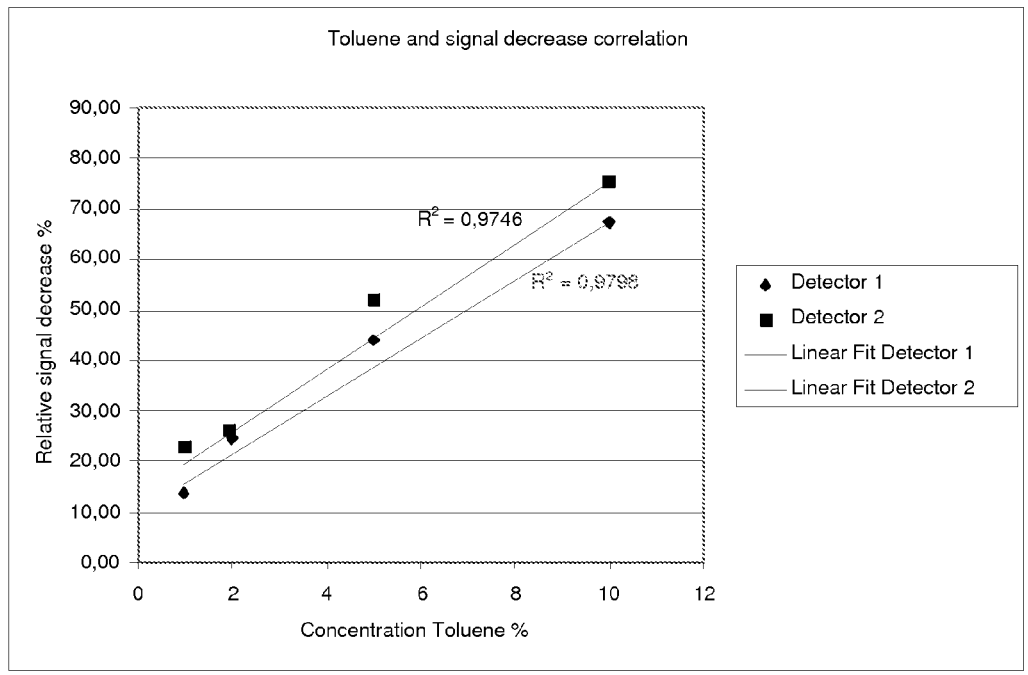
FIG. 3 discloses the relative signal decrease measured on a yellow/red flame detector for compositions comprising different concentrations of toluene in a heating fuel composition comprising a Fischer-Tropsch derived kerosene as in FIGS. 1 and 2.
Figure 4:
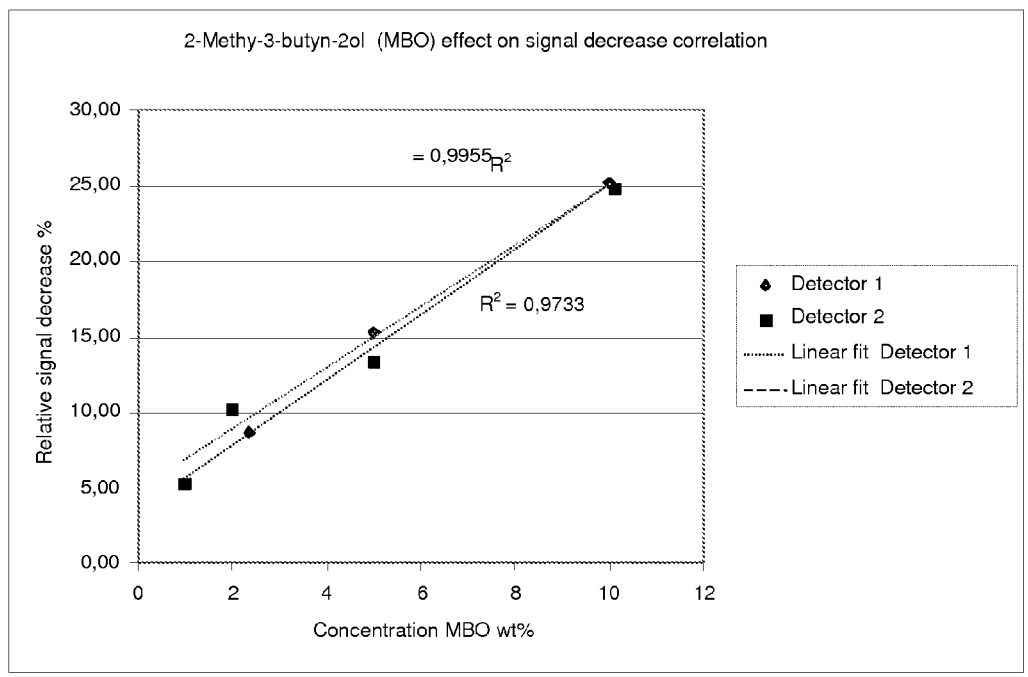
FIG. 4 discloses the relative signal decrease measured on yellow flame detectors for compositions comprising different concentrations of—as a comparative example—2-methyl-3-butyn-2-ol in a fuel composition comprising a Fischer-Tropsch derived kerosene as in FIGS. 1, 2 and 3.

The concentration dependent efficacy of the tested fuel compositions was analysed. FIGS. 1 to 4 show the resulting graphs for blends of a Fischer-Tropsch derived base fuel kerosene, and tetrahydronaphthalene, toluene, dicyclopentadiene, and as comparative Example 9 2-methyl-3-butin-2-ol in concentrations of 1, 2, 5 and 10 wt %, based on the total amount of composition.

We claim:

1. A domestic heating fuel composition, comprising
(a) a paraffinic hydrocarbon composition comprising at least 90 wt % normal paraffins and/or iso-paraffins comprising from 6 to 24 carbon atoms, wherein the weight ratio of iso-paraffins to normal-paraffins is between 6 to 1 and 1 to 1, and
(b) at least one compound having a C/H molar ratio of above 0.8 and soluble in component (a) at ambient conditions, wherein the component (b) is present in the fuel composition in an amount effective to increase the responsiveness of a yellow/red flame detector to a required threshold level.

2. The fuel composition according to of claim 1 wherein component (b) is present in an amount of from 0.01% to 15 wt %, based on the total fuel composition.

3. The fuel composition of claim 1 wherein the n-paraffins and/or iso-paraffins of component (a) comprise from 7 to 18 carbon atoms.

4. The fuel composition of claim 1 wherein the weight ratio of iso-paraffins to normal-paraffins in component (a) is between 4:1 and 1:1.

5. The fuel composition of claim 1 comprising at least 85 wt % of component (a), less than 500 ppm sulphur and less than 10 ppm nitrogen.

6. The fuel composition of claim 2 wherein the component (a) boils for more than 90 wt % between 160 and 400° C.

7. The fuel composition of claim 1 which composition has a density of between 0.65 and 0.8 g/cm3 at 15° C., and boils for more than 90 wt % in the range of from 170° C. to 280° C.

8. The fuel composition of claim 7 wherein the pour point is below −40° C.

9. The fuel composition of claim 1 wherein the n-paraffins and iso-paraffins in component (a) are derived from an optionally isomerised product of (i) a Fischer-Tropsch synthesis, and/or are derived from (ii) the product of a process comprising a reductive decarboxylation/decarbonylation reaction of fatty acids and/or fatty acid esters.

10. The fuel composition of claim 9 wherein the reductive decarboxylation/decarbonylation reaction is carried out bringing a feedstock comprising C8-C24 fatty acids, derivatives of C8-C24 fatty acids, or combinations thereof into contact with a heterogeneous catalyst comprising one or more Group VIII metals selected from platinum, palladium, nickel, iridium, ruthenium and rhodium on a support selected from oxides and/or carbonaceous catalyst supports in the presence of hydrogen under decarboxylation/decarbonylation conditions.

11. The fuel composition of claim 1 wherein the compound (b) is selected from the group comprising alkyl aromatic compounds, and/or conjugated or non-conjugated ethylenically and/or acetylenically unsaturated compounds and/or mixtures thereof.

12. The fuel composition of claim 11 wherein the compound (b) is an alkyl-substituted monoaromatic compound, a conjugated cyclic or non-cyclic diene, or an acetylenically unsaturated alcohol, present in an amount of from 0.01 to 10 wt %, based on the total composition.

13. The fuel composition of claim 1 wherein the component (a) comprises a Fischer-Tropsch product which contains more than 80 wt % of normal- and iso-paraffins, less than 1 wt % aromatics, less than 5 ppm sulphur and less than 1 ppm nitrogen and wherein the density of the Fischer-Tropsch derived product is between 0.65 and 0.8 g/cm3 at 15 ° C.

14. The fuel composition of claim 1 further comprising an odour marker, a colour marker and/or performance additives.

15. A method for the generation of heat by evaporation and combustion of the fuel composition in the presence of oxygen to form hot flue gases wherein a fuel composition of claim 1 is provided as the fuel composition.

16. The method of claim 15 wherein the flue gases as obtained are used to heat water by means of indirect heat exchange in a water boiler.

* * * * *